(12) United States Patent  
Algrain et al.

(10) Patent No.: US 6,463,891 B2
(45) Date of Patent: Oct. 15, 2002

(54) TWIN FAN CONTROL SYSTEM AND METHOD

(75) Inventors: Marcelo C. Algrain; Paul A. Dicke, both of Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/729,493

(22) Filed: Dec. 4, 2000

(65) Prior Publication Data

US 2001/0029907 A1 Oct. 18, 2001

Related U.S. Application Data

(60) Provisional application No. 60/172,184, filed on Dec. 17, 1999.

(51) Int. Cl.[7] .................................................. F01P 7/02
(52) U.S. Cl. .................................. 123/41.12; 123/41.49
(58) Field of Search ........................ 123/41.12, 41.29, 123/41.31, 41.48, 41.49, 41.51, 41.65

(56) References Cited

U.S. PATENT DOCUMENTS

| 3,630,003 A | | 12/1971 | Ashton et al. |
| 4,426,960 A | | 1/1984 | Hart |
| 4,489,680 A | | 12/1984 | Spokas et al. |
| 4,499,865 A | | 2/1985 | Charles |
| 4,539,942 A | * | 9/1985 | Kobayashi et al. ......... 123/41.1 |
| 4,590,772 A | * | 5/1986 | Nose et al. .................... 62/184 |
| 4,651,922 A | | 3/1987 | Noba |
| 4,698,761 A | * | 10/1987 | Cooper et al. ............... 364/424 |
| 4,726,325 A | * | 2/1988 | Itakura ....................... 123/41.1 |
| 4,765,284 A | | 8/1988 | Kanazawa et al. |
| 4,977,862 A | * | 12/1990 | Aihara et al. ............. 123/41.12 |
| 5,046,550 A | | 9/1991 | Boll et al. |
| 5,441,099 A | * | 8/1995 | Yasso ........................... 165/41 |
| 6,076,488 A | * | 6/2000 | Yamagishi ................ 123/41.12 |
| 6,178,928 B1 | * | 1/2001 | Corriveau ................. 123/41.12 |
| 6,216,778 B1 | * | 4/2001 | Corwin et al. ............... 165/299 |

FOREIGN PATENT DOCUMENTS

JP 305312 * 12/1990 ............. F01P/7/16

* cited by examiner

Primary Examiner—Tony M. Argenbright
Assistant Examiner—Hai Huynh
(74) Attorney, Agent, or Firm—Blackwell Sanders Peper Martin LLP (57) ABSTRACT

A control system and method for controlling the speed of a plurality of fans for cooling a plurality of fluids in a work machine in accordance with the heat dissipation requirements of the particular heat transfer cores, the present control system including a plurality of sensors positioned to sense the temperature of each of the plurality of fluids, each sensor being operable to output a signal indicative of the temperature of that particular fluid. An electronic controller coupled to the sensors receives signals indicative of the temperature of each of the plurality of fluids, determines therefrom a desired fan speed for each fan, and outputs a signal to individually control the speed of each fan. Each output signal is based upon a comparison of at least some of the temperature error signals determined from the plurality of sensor signals.

35 Claims, 8 Drawing Sheets

Fig. 2

Fig_4A

Fig. 4B

Fig_5

IMAT Set Pt. vs Ambient Temp.

Fig_6

Max. Speed vs Implement Oil Temp.

Max. Speed vs Engine Coolant Temp.

Max. Speed vs IMAT Temp. Error

TWIN FAN CONTROL SYSTEM AND METHOD

This application claims the benefit of prior provisional patent application Ser. No. 60/172,184 filed Dec. 17, 1999.

TECHNICAL FIELD

This invention relates generally to control systems and methods for work machines and, more particularly, to a system and method for controlling the operation of a plurality of fans positioned in an arrangement to provide cooling for a plurality of heat transfer cores positioned therearound.

BACKGROUND ART

Construction and earthmoving equipment as well as a wide variety of other types of work machines are commonly used in a wide variety of construction and earthmoving applications. Heat is a natural by-product of the engine and the other functional equipment associated with work machines and must therefore be dissipated efficiently in order to keep the engine and other equipment within proper operating temperature limits for optimum and continued sustained performance. As a result, a wide variety of different types of cooling systems are utilized to accomplish this task. Controlled heat dissipation through a properly controlled cooling system optimizes the performance of the overall work machine as well as the performance of the functional mechanical components associated therewith.

Using one or more fans for cooling a plurality of heat transfer cores in a work machine is quite common. When a single fan is utilized, such a fan is typically installed in series with a plurality of heat exchanger cores. Such prior art fan configurations typically impede optimal heat dissipation and optimal positioning of the heat exchanger cores and adversely affect the efficiency and balance of the overall machine. Such prior art designs also add to the overall size of the machine which must be kept to a minimum due to space limitations as well as dimensional constraints on operator visibility. In this regard, the packaging length of the cooling system is typically limited by the axial spacing of the power train components and the width of such system is typically limited by the existing frame rail dimensions. Such serial positioning of the heat exchanger cores also makes it difficult to clean out debris carried by the air flow and blown into the fins of the various serially positioned heat exchanger cores. Debris collected in the fins insulates the transfer of heat therefrom thereby adversely impacting the performance and efficiency of the heat dissipation equipment and the overall machine.

Utilizing a single fan to provide cooling to a plurality of heat exchanger cores also requires use of a larger diameter fan to accomplish the necessary cooling. This typically translates into a larger axial length since fan depth typically increases with fan size. This arrangement likewise adds to the overall size of the cooling system and the machine.

When a plurality of fans are utilized to cool a plurality of heat transfer cores, these fans are usually driven directly off of the engine of the work machine with a drive belt or other mechanism whereby fan speed is a direct function of the speed of the work machine engine. In such prior art fan control systems, cooling of the heat transfer cores may occur even when cooling is not desired. No speed reduction capability when cooling is not required consumes unnecessary power which could be used for useful work. In addition, most fans tend to run unnecessarily in cold weather tending to overcool fluids like hydraulic oil, transmission oil, and engine coolant. Similarly, undesired cooling at any time can also cause the fluids carried by the heat transfer cores to reach an undesirable overcooled condition. When this occurs, work machine performance is not only degraded, but operation of the cooling system under such circumstances is unnecessary, inefficient and results in unnecessary fuel consumption and wasted power. Besides causing unnecessary fuel consumption, undesired fan operation adds to the noise emissions of the overall work machine. Furthermore, the functional components served by the fluid in an overcooled heat transfer core are also overcooled, causing both reliability and performance problems for such components and therefore for the overall work machine.

Although known control systems for cooling heat transfer cores do employ means for controlling the operation of the cooling fans based upon certain temperature conditions associated with the heat transfer conditions associated with the heat transfer cores, such known means do not always provide cooling airflow only to the degree required, and such known means are not always sufficiently responsive to changes in the fluid temperature of the heat transfer cores without overshooting temperature design limits. Such known systems likewise do not always prevent overcooling of fluids in the respective heat transfer cores served by them.

It is therefore desirable to provide a cooling fan control system which will control the operation of a plurality of fans for cooling a plurality of heat transfer cores in a work machine so as to provide air flow only to the degree required, which is responsive enough to rapid changes in the temperature of the fluid in the heat transfer cores served by each fan without overshooting temperature design limits, which prevents overcooling of fluids in the respective cores served by each respective fan, and which minimizes fuel consumption and noise emissions of the overall work machine.

Accordingly, the present invention is directed to overcoming one or more of the problems set forth above.

DISCLOSURE OF THE INVENTION

In one aspect of this invention, a control system for controlling the speed of a plurality of fans for cooling a plurality of fluids in a work machine, each of the plurality of fluids being operative between a predetermined minimum threshold temperature and a predetermined maximum threshold temperature is disclosed. The control system includes a plurality of sensors positioned to sense the temperature of each of the plurality of fluids, each sensor being operable to output a signal indicative of the temperature of that particular fluid, an electronic controller coupled with the plurality of sensors for receiving signals therefrom, the controller being operable to receive a signal from each of the plurality of sensors indicative of a temperature for each of the plurality of fluids, the controller being further operable to determine a desired fan speed for each of the plurality of fans based upon signals received from the plurality of sensors, and the controller outputting a signal to each of the plurality of fans to individually control the speed thereof, each output signal being indicative of a desired fan speed for a particular fan and each output signal being based upon a comparison of at least some of the signals received from the plurality of sensors.

In another aspect of this invention, a method for controlling the speed of a plurality of fans for cooling a plurality of fluids in a work machine, each of the plurality of fluids being operative between a predetermined minimum threshold temperature and a predetermined maximum threshold temperature is disclosed. The method includes the steps of positioning a plurality of sensors to sense the temperature of each of the plurality of fluids, each sensor being operable to output a signal indicative of the temperature of that particular fluid, coupling an electronic controller with the plurality of sensors for receiving signals therefrom, the controller being operable to receive a signal from each of the plurality of sensors indicative of a temperature for each of the plurality of fluids, operably determining a desired fan speed for each of the plurality of fans based upon signals received from the plurality of sensors utilizing the controller, and outputting a signal to each of the plurality of fans to individually control the speed thereof utilizing the controller, each output signal being indicative of a desired fan speed for a particular fan and each output signal being based upon a comparison of at least some of the signals received from the plurality of sensors.

BRIEF DESCRIPTION OF THE DRAWINGS

For a better understanding of the present invention, reference may be made to the accompanying drawings in which.

BEST MODE FOR CARRYING OUT THE INVENTION

Figure 1:
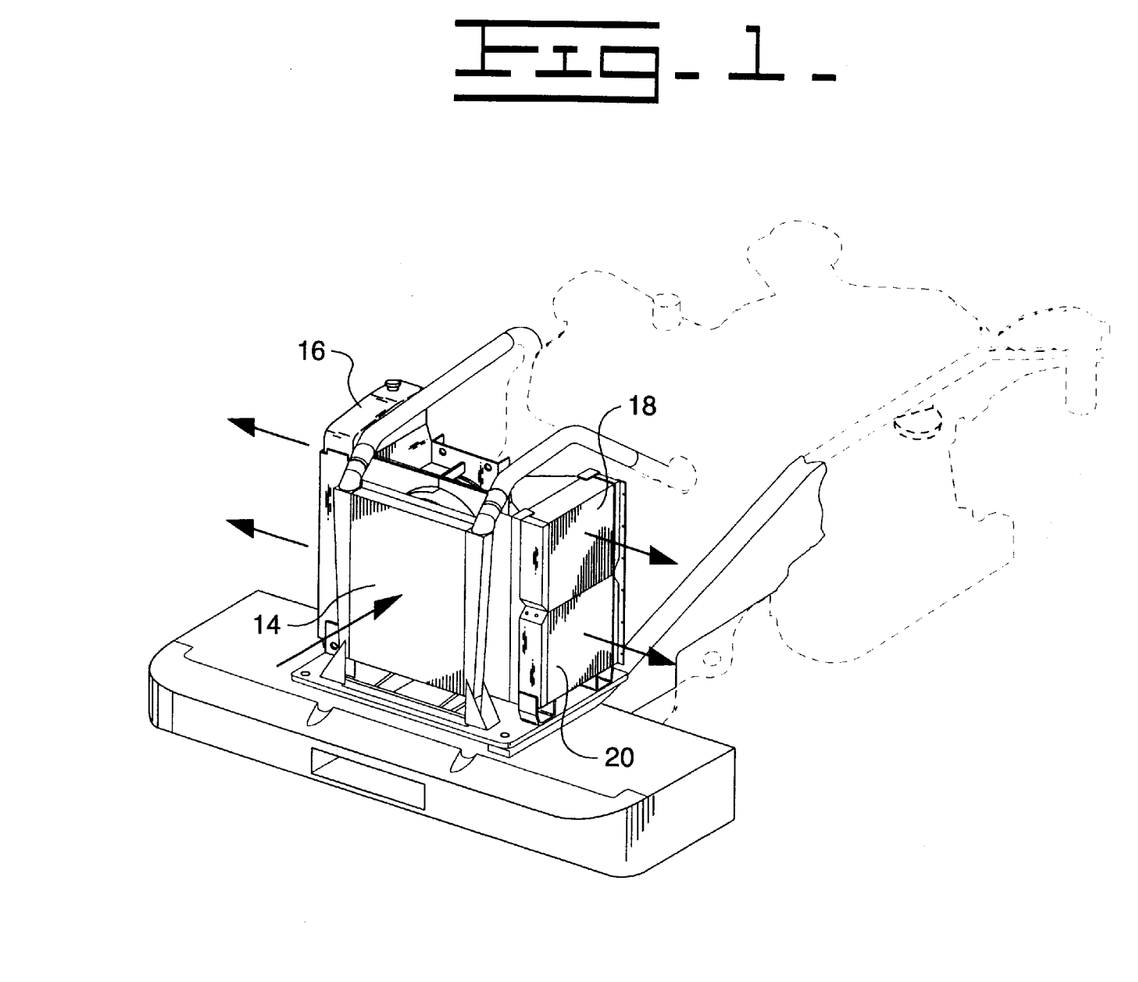
FIG. 1 is a perspective view of one embodiment of a twin cooling fan and heat transfer core arrangement constructed in accordance with the teachings of the present invention wherein other equipment associated with a particular work machine are shown in phantom outline form.
Figure 2:
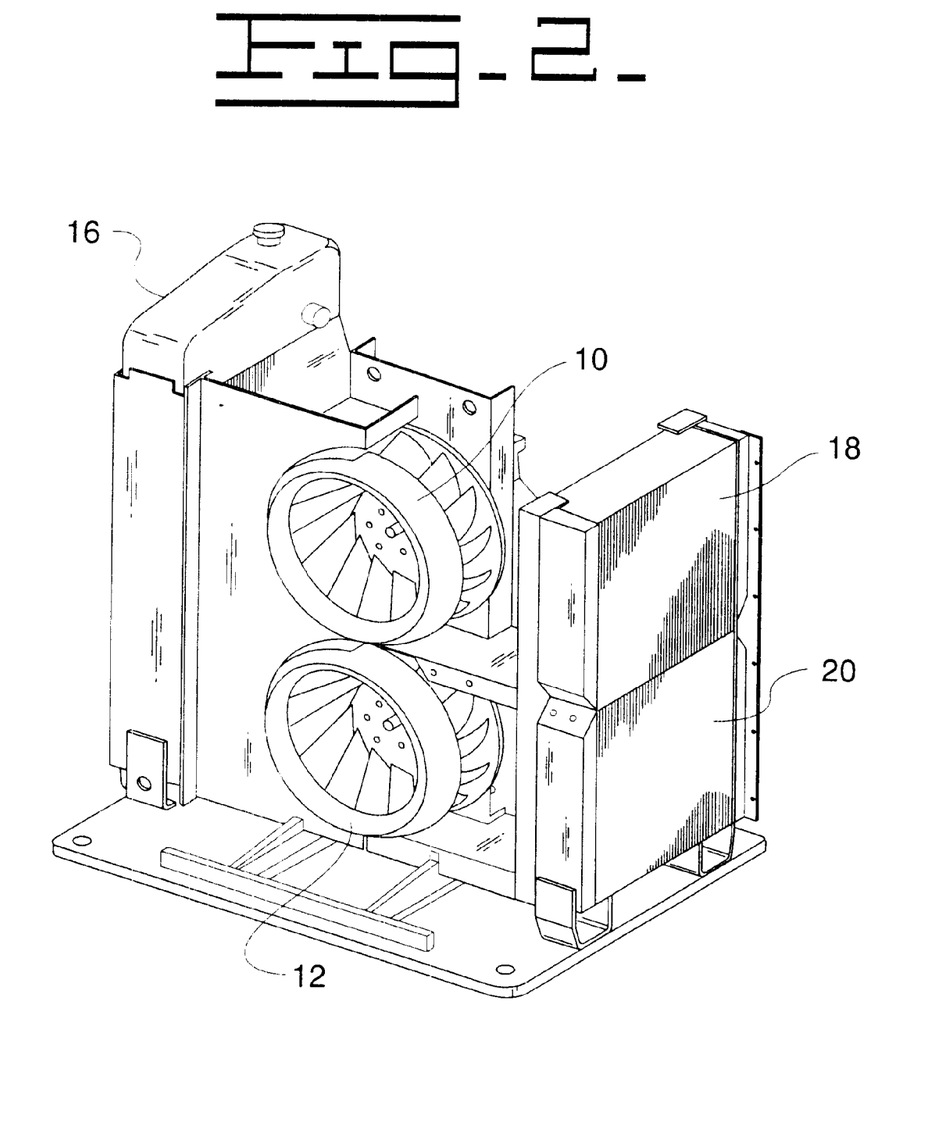
FIG. 2 is a perspective view of the cooling apparatus, illustrated in FIG. 1, depicting the inter-positioning of the twin radial fans relative to the heat transfer cores positioned on each opposite side of the respective fans, the upstream heat transfer core and some duct work associated therewith being removed for viewing the twin fan arrangement.

In one embodiment of the present invention, as best shown in FIGS. 1 and 2, two substantially identical radial fans 10 and 12 are vertically positioned one on top of the other for dissipating heat generated by the engine and other functional equipment associated with a particular work machine. Radial fans 10 and 12 operate so as to draw in air from the front and expel it radially from the peripheral sides thereof. Fans 10 and 12 are positioned and located so as to be surrounded by heat transfer cores 14, 16, 18, and 20 on three sides thereof as will be more fully explained below to more efficiently package the overall cooling system to conserve space, improve cooling effectiveness, and reduce noise.

More particularly, an air to air aftercooling core (ATAAC core) 14 is positioned upstream in front of the two vertically stacked fans 10 and 12 substantially eclipsing the entire frontal surface area of both fans. This arrangement provides more air flow through all portions of the ATAAC core 14. An engine coolant heat transfer core 16 is positioned downstream of the ATAAC core 14 on one discharge side of the fans, whereby engine coolant core 16 receives air expelled radially by both fans on that particular side. A two-compartment oil heat transfer core is positioned downstream of the ATAAC core 14 on the opposite discharge side of fans 10 and 12, each oil core compartment receiving air expelled radially by one fan respectively. For example, upper core compartment 18 receives air from upper fan 10 and provides cooling for the hydraulic oil whereas lower core compartment 20 receives air from lower fan 12 and provides cooling for the transmission oil. Engine coolant core 16 and the two oil cores 18 and 20 receive air in parallel from fans 10 and 12 and the cores are designed with core densities which yield an equal fan air pressure drop on both discharge sides of fans 10 and 12 thereby resulting in equal air flow loading. Each fan is preferably driven independently, thereby permitting the speed of each fan to be controlled in accordance with the separate heat dissipation requirements of the particular heat transfer cores served by that particular fan. Shrouds and other ducting means positioned both upstream and downstream of the fans separate the two fan airflow streams to inhibit internal recirculation when fans 10 and 12 are operating at different speeds.

Figure 3:
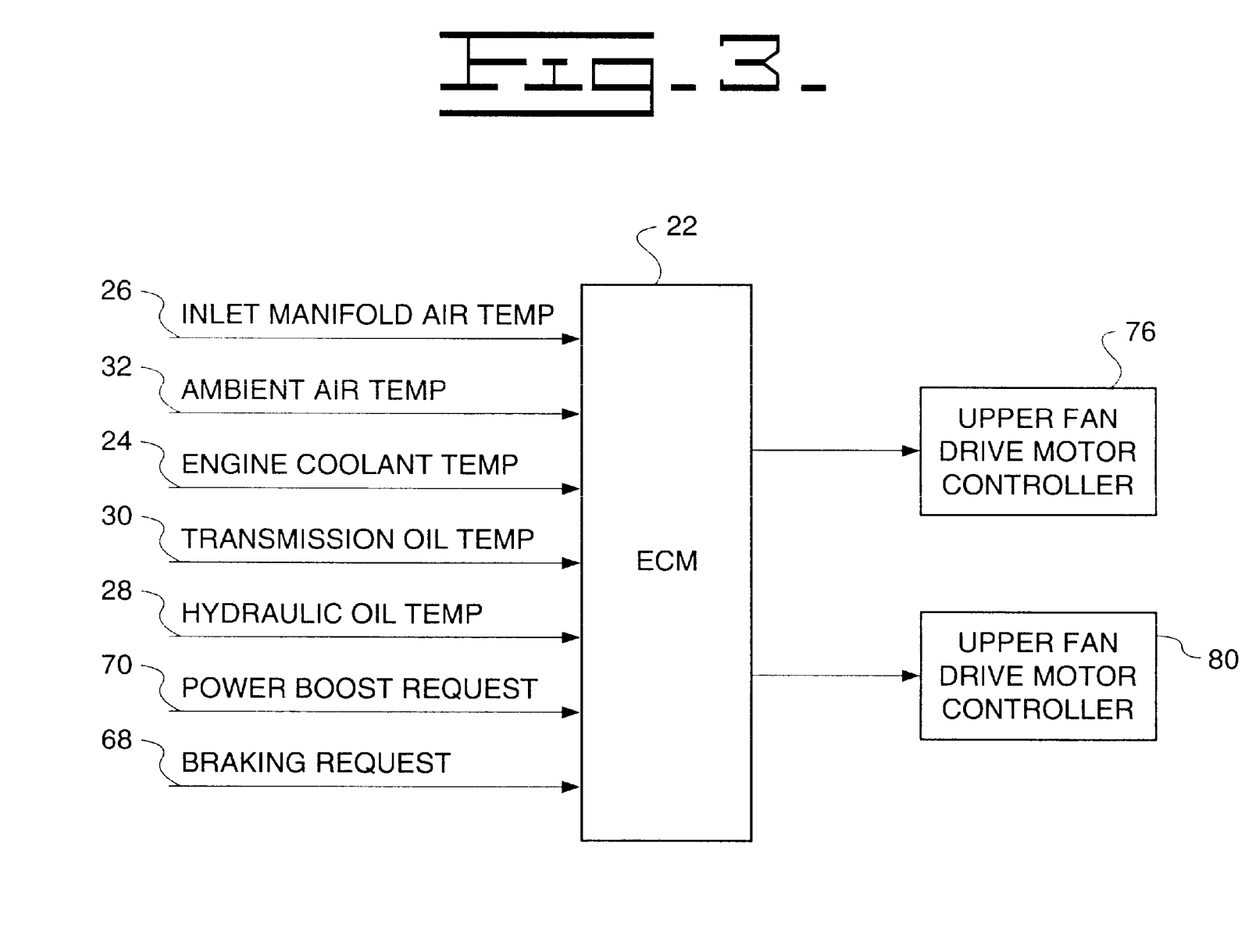
FIG. 3 is a schematic illustration of one embodiment of a fan control system constructed in accordance with the teachings of the present invention.

In one embodiment of the present invention as illustrated in FIG. 3, operation of fans 10 and 12 is controlled by an electronic control module (ECM) 22, or some other controller or processor means capable of receiving and outputting signals as will be hereinafter explained. Electronic controllers or modules such as ECM 22 are commonly used in association with work machines for controlling and accomplishing various functions and tasks including monitoring and controlling a wide variety of engine functions such as engine speed, engine load, the speed of various motors, fuel injection, and so forth. Controllers and electronic modules such as ECM 22 are typically utilized for delivering current control signals to devices such as control valves, pumps, actuators, motor controllers, and a wide variety of various other mechanical components to control the operation of the work machine. In this regard, ECM 22 will typically include processing means such as a microcontroller or microprocessor, associated electronic circuitry such as input/output circuitry, analog circuits, programmed logic arrays, and associated memory.

As illustrated in FIG. 3, ECM 22 is preferably coupled to a plurality of sensors for monitoring the temperature of certain fluids present in the work machine. More specifically, ECM 22 is preferably coupled to a temperature sensor positioned in proximity to the engine coolant fluid associated with the work machine so as to receive a signal 24 therefrom indicative of the temperature of the engine coolant exiting the engine. One skilled in the art will appreciate that the engine coolant sensor, as with the other sensors discussed below, should be positioned relative to the particular fluid being sensed so as to continuously monitor the temperature of the particular fluid at a location where that particular fluid temperature is expected to be its highest, or where that particular fluid temperature is expected to reach a maximum threshold temperature. ECM 22 is similarly preferably coupled to a sensor positioned in proximity to the ATAAC core 14 to receive a signal 26 therefrom indicative of the inlet manifold air temperature associated with the ATAAC core 14, to a sensor positioned in proximity to the hydraulic oil to receive a signal 28 therefrom indicative of the hydraulic oil temperature, to a sensor positioned in proximity to the transmission oil to receive a signal 30 therefrom indicative of the transmission oil temperature, and to a sensor exposed to the ambient air to receive a signal 32 therefrom indicative of the ambient air temperature. These sensors preferably continuously monitor the temperature of their respective fluids and each outputs an appropriate, signal to ECM 22 indicative of such sensed parameters.

ECM 22 determines the appropriate fan speed for both fans 10 and 12 based upon the input signals 24, 26, 28, 30, and 32 illustrated in FIG. 3. In one embodiment of the present invention, ECM 22 determines the fan speed for fans 10 and 12 in accordance with the logic diagram illustrated in FIGS. 4A and 4B. In this particular embodiment, ECM 22 first calculates a hydraulic oil temperature error at step 33 by subtracting the hydraulic oil temperature indicated by signal 28 from a predetermined desired threshold temperature for the hydraulic oil. The predetermined desired threshold temperature for the hydraulic oil is that set point temperature at which the hydraulic oil is preferably maintained during normal work machine operation. ECM 22 then checks to see whether the hydraulic oil temperature error just calculated is indicative of an overcooled situation at step 34. This check can be accomplished by comparing the actual hydraulic oil temperature sensed via sensor signal 28 with the known overcooled temperature for the hydraulic oil, or by comparing the calculated temperature error with an error value indicative of an overcooled condition. If the hydraulic oil temperature error at step 34 does indicate that a predetermined hydraulic oil overcooled situation exists, then ECM 22 will set the speed of upper fan 10 to zero at step 36 and will proceed to step 38. If, on the other hand, the hydraulic oil temperature error at step 34 does not indicate a predetermined hydraulic oil overcooled condition exists at step 34, then ECM 22 preferably scales the hydraulic oil temperature error by a predetermined gain value at step 40 and proceeds to step 41.

Figure 4A:
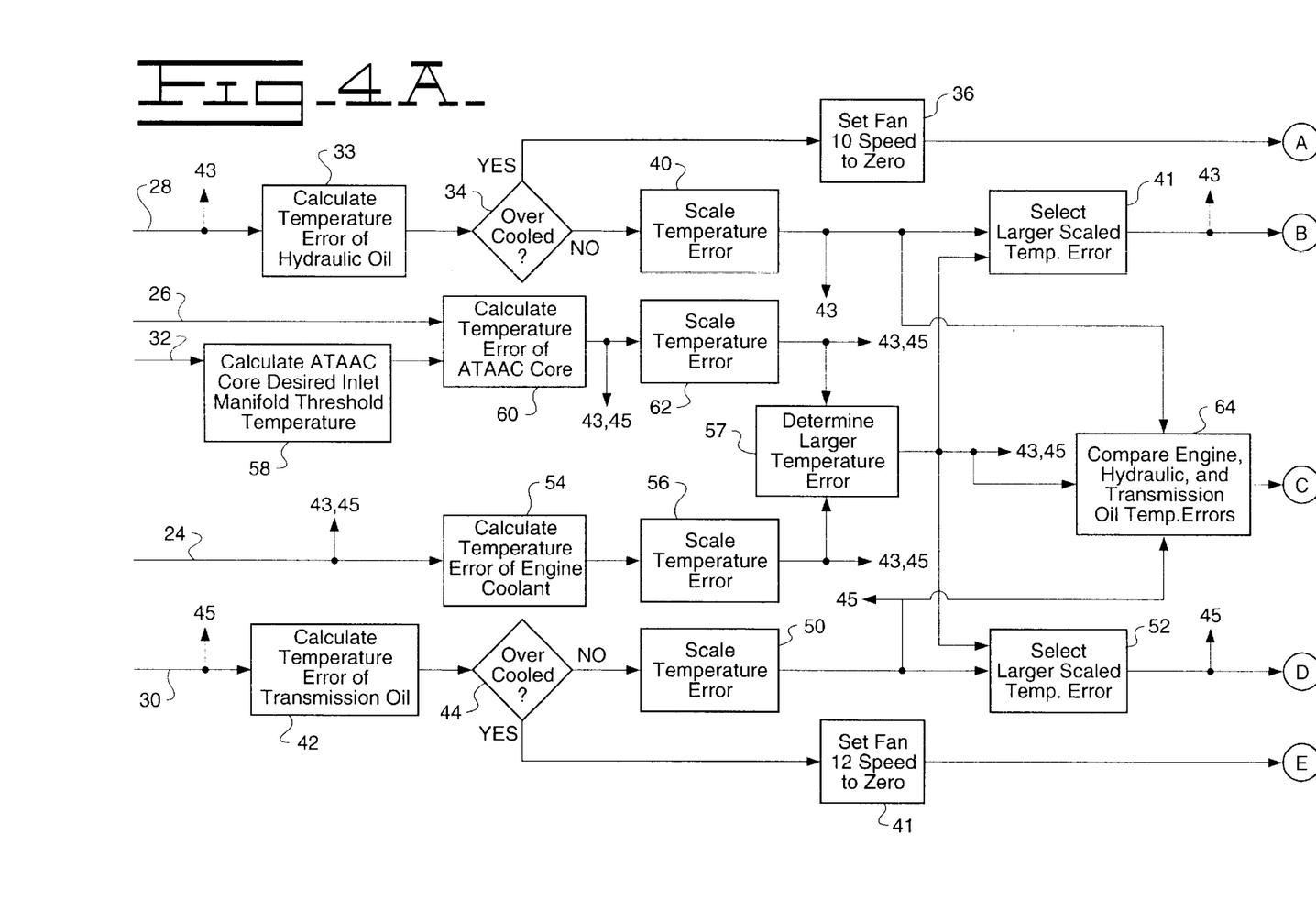
FIGS. 4A and 4B are flow charts illustrating the logic for determining and setting a desired fan speed for each fan in one embodiment of the present invention.
Figure 4B:
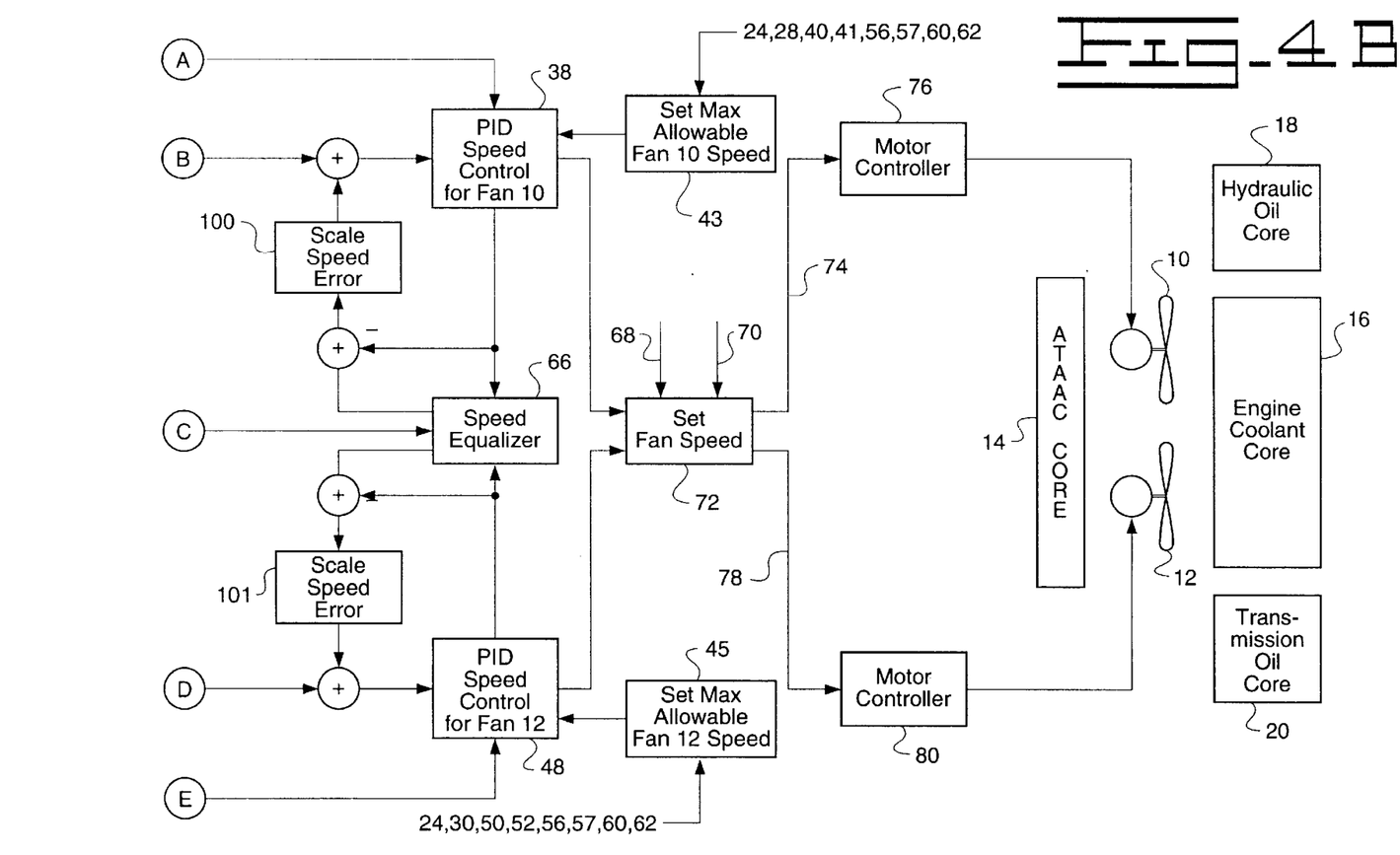

ECM 22 similarly calculates a transmission oil temperature error at step 42 by again subtracting the transmission oil temperature indicated by signal 30 from a predetermined desired threshold temperature for the transmission oil. ECM 22 then again checks to see whether the transmission oil temperature error just calculated is indicative of an overcooled condition at step 44. If the transmission oil temperature error at step 44 does indicate that a predetermined transmission oil overcooled condition exists, then ECM 22 will set the speed of lower fan 12 to zero at step 41 and will proceed to step 48. If, on the other hand, the transmission oil temperature error at step 44 does not indicate a predetermined transmission oil overcooled condition exists at step 44, then ECM 22 again preferably scales the transmission oil temperature error by a predetermined gain value at step 50 and proceeds to step 52.

Figure 5:
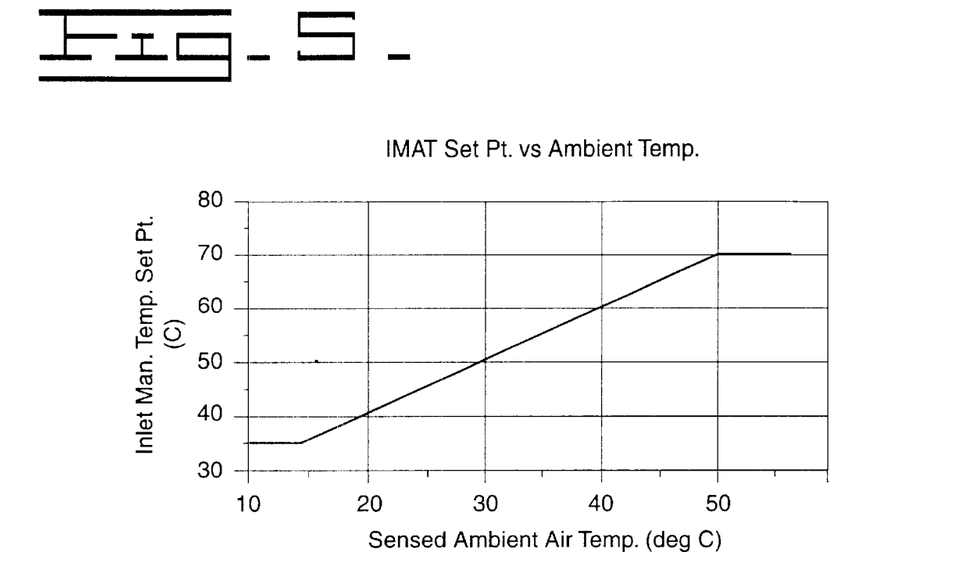
FIG. 5 is a graphical illustration showing the relationship between the sensed ambient air temperature and a desired inlet manifold threshold temperature for the ATAAC core in one embodiment of the present invention.

ECM 22 similarly calculates an engine coolant temperature error at step 54 by subtracting the engine coolant temperature indicated by signal 24 from a predetermined desired threshold temperature for the engine coolant. ECM 22 then preferably scales the engine coolant temperature error at step 56 by a predetermined gain value, and proceeds to step 57. ECM 22 also similarly calculates the ATAAC inlet manifold air temperature error at step 60 by subtracting the inlet manifold air temperature indicated by signal 26 from a desired threshold inlet manifold air temperature for the ATAAC core 14. In this regard, since the desired threshold inlet manifold air temperature for the ATAAC core 14 is a function of ambient air temperature, ECM 22 continuously calculates a desired inlet manifold threshold temperature at step 58 based upon the sensor signal 32 indicative of the ambient air temperature. In one embodiment of the present invention, ECM 22 determines the desired threshold inlet manifold air temperature for the ATAAC core 14 in accordance with the relationship illustrated by the graph of FIG. 5. As the sensed ambient air temperature of FIG. 5 changes, so does the desired threshold inlet manifold temperature for the ATAAC core 14 and this desired threshold temperature is constantly computed by ECM 22 and used to determine the ATAAC inlet manifold air temperature at step 60. Upon determining both the desired threshold inlet manifold air temperature for the ATAAC core 14 and its corresponding temperature error, ECM 22 then preferably scales the ATAAC temperature error determined at step 60 by a predetermined gain value at step 62 and proceeds to step 57. At step 57, ECM 22 determines the higher of the scaled engine coolant temperature error determined at step 56 and the scaled ATAAC inlet manifold temperature error determined at step 62, which higher temperature error is termed the engine temperature error by those skilled in the art. Once the higher engine temperature error has been selected at step 57, the ECM 22 proceeds to steps 41 and 52.

Figure 6:
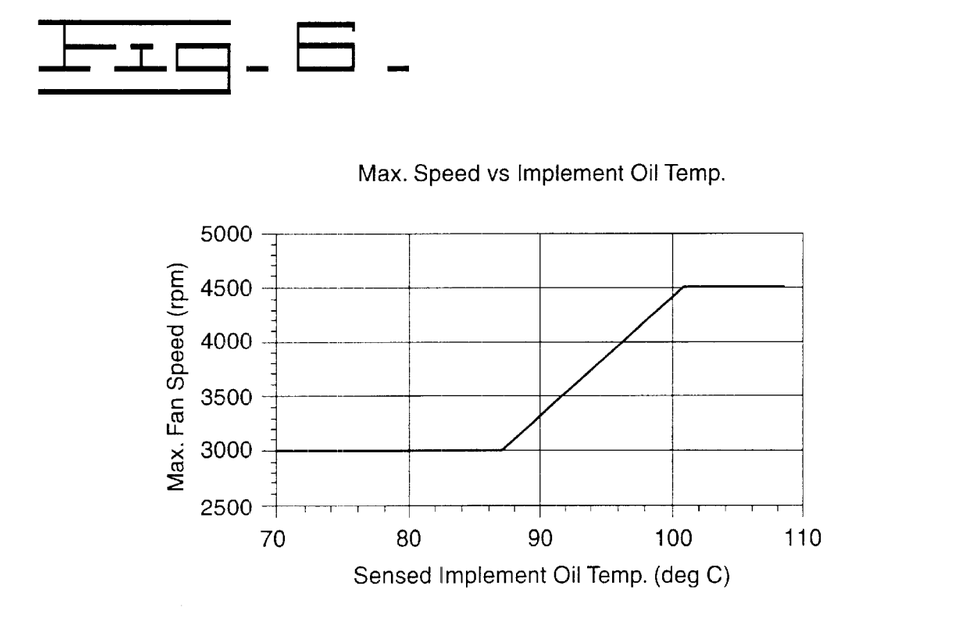
FIG. 6 is a graphical illustration showing the relationship between the sensed hydraulic oil temperature and a corresponding fan speed in one embodiment of the present invention.
Figure 7:
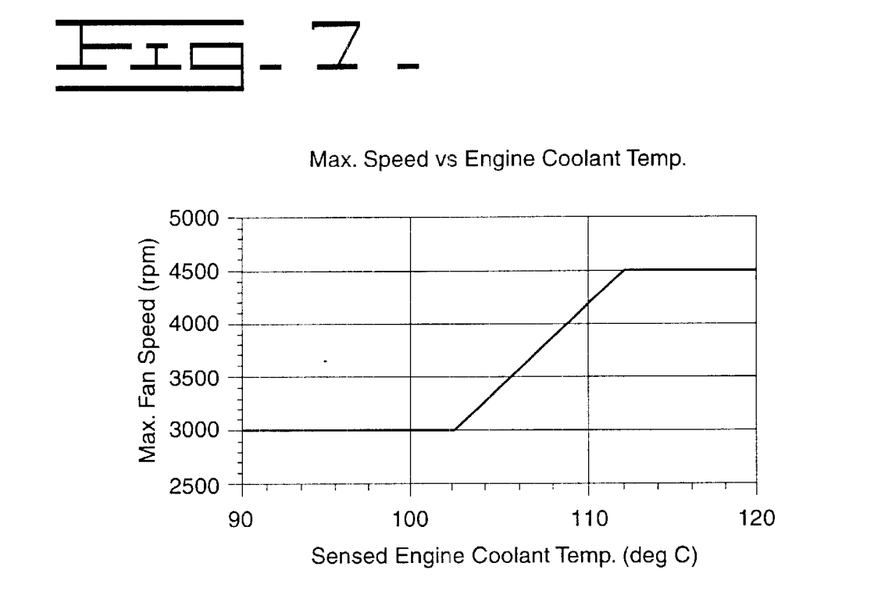
FIG. 7 is a graphical illustration showing the relationship between the sensed engine coolant temperature and a corresponding fan speed in one embodiment of the present invention.
Figure 8:
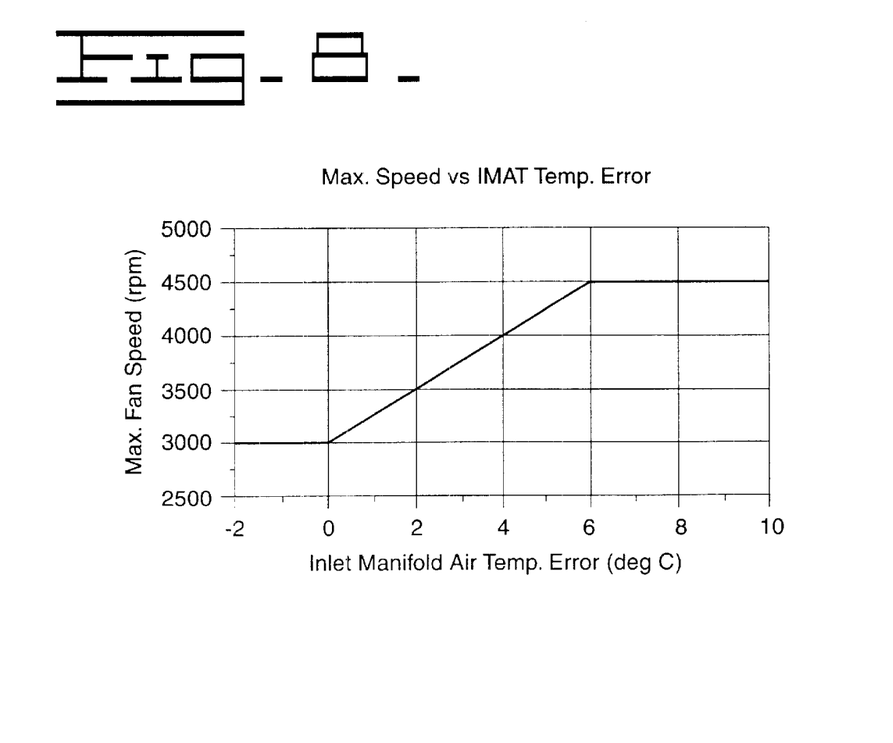
FIG. 8 is a graphical illustration showing the relationship between the inlet manifold air temperature error and a corresponding fan speed in one embodiment of the present invention.

At step 41, ECM 22 determines the larger of the scaled hydraulic oil temperature error determined at step 40 and the engine temperature error determined at step 57. ECM 22 then determines a maximum allowable fan speed for upper fan 10 at step 43 based upon the larger of the two scaled temperature errors 40 and 57 and other parameters as described in one embodiment below. In one embodiment of the present invention, if the scaled hydraulic oil temperature error 40 is greater at step 41, then ECM 22 determines the maximum allowable fan speed for upper fan 10 at step 43 based upon the cooling requirements of the hydraulic oil core 18 in accordance with the relationship illustrated in the graph of FIG. 6 using sensed hydraulic oil temperature 28, and proceeds to step 38. On the other hand, if the scaled engine temperature error 57 is greater in step 41, then ECM 22 determines the maximum allowable fan speed for fan 10 at step 43 based upon the cooling requirements of the engine coolant core 16 in accordance with the relationship illustrated in the graph of FIG. 7 using sensed engine coolant temperature 24 if the scaled engine coolant temperature error 56 was greater in step 57, or ECM 22 will determine the maximum allowable fan speed for upper fan 10 at step 43 based upon the cooling requirements of the ATAAC core 14 in accordance with the relationship illustrated in the graph of FIG. 8 using ATAAC core temperature error 60 if the scaled ATAAC core inlet manifold temperature error 62 was greater in step 57.

Figure 9:
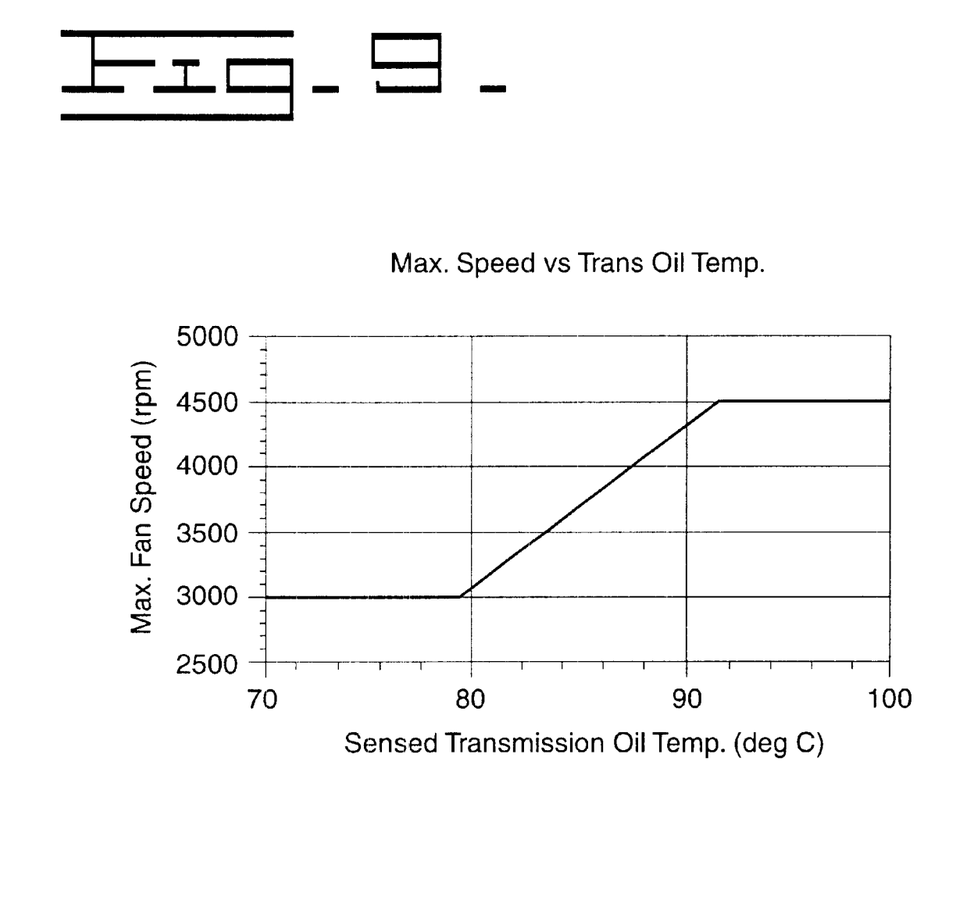
FIG. 9 is a graphical illustration showing the relationship between the sensed transmission oil temperature and a corresponding fan speed in one embodiment of the present invention.

Similarly, at step 52, ECM 22 determines the larger of the scaled transmission oil temperature error determined at step 50 and the engine temperature error determined at step 57. ECM 22 then determines a maximum allowable fan speed for lower fan 12 at step 45 based upon the larger of the two scaled temperature errors 50 and 57 and other parameters as described in one embodiment below. In one embodiment of the present invention, if the scaled transmission oil temperature error 50 is greater at step 52, then ECM 22 determines the maximum allowable fan speed for lower fan 12 at step 45 based upon the cooling requirements of the transmission oil core 20 in accordance with the relationship illustrated in the graph of FIG. 9 using sensed transmission oil temperature 30, and proceeds to step 48. On the other hand, if the sensed engine temperature error 57 is greater in step 52, then ECM 22 determines the maximum allowable fan speed for lower fan 12 at step 45 based upon the cooling requirements of the engine coolant core 16 in accordance with the relationship illustrated in the graph of FIG. 7 using sensed engine coolant temperature 24 if the scaled engine coolant temperature error 56 was greater in step 57, or ECM 22 will determine the maximum allowable fan speed for lower fan 12 at step 45 based upon the cooling requirements of the ATAAC core 14 in accordance with the relationship illustrated in the graph of FIG. 8 using ATAAC core temperature error 60 if the scaled ATAAC core inlet manifold temperature error 62 was greater in step 57.

ECM 22 then delivers a signal indicative of the change needed in fan speed for upper fan 10 in step 41 to a PID controller in step 38, and a signal indicative of the change needed in fan speed for lower fan 12 in step 52 to a PID speed controller in step 48. PID controllers are known to those skilled in the art and are commonly used for controlling the operation of mechanical devices in work machines and other mechanical equipment. In this regard, it is recognized and anticipated that any type of PID controller may be utilized in steps 38 and 48 without departing from the spirit and scope of the present invention.

At step 64, ECM 22 determines whether the engine temperature error determined at step 57 is greater than both the hydraulic oil temperature error at step 40 and the transmission oil temperature error at step 50. If true, such event signifies that both fans 10 and 12 are servicing the cooling requirements of the ATAAC core 14 or the engine coolant core 16. In this event, ECM 22 proceeds to step 66 wherein it computes an average of the two fan speeds determined for fans 10 and 12 at steps 38 and 48. ECM 22 subtracts the fan speed for upper fan 10 from the average speed, and the resulting speed, whether a positive value or a negative value, is scaled at step 100 and added to (or subtracted from) the temperature error signal of upper fan 10 determined in step 41 before being delivered to the PID speed controller at step 38. If false, the output of step 66 associated with fan 10 is the speed of fan 10 instead of the average speed of fans 10 and 12, which is subtracted from itself resulting in a null value at step 100. The output of PID controller 38 is limited to the maximum allowable fan speed determined in step 43. Similarly, ECM 22 subtracts the fan speed for lower fan 12 from the average speed, and the resulting speed, whether a positive value or a negative value, is scaled at step 101 and added to (or subtracted from) the temperature error signal of lower fan 12 determined in step 52 before being delivered to the PID speed controller at step 48. If false, the output of step 66 associated with fan 12 is the speed of fan 12 instead of the average speed of fans 10 and 12, which is subtracted from itself resulting in a null value at step 101. The output of PID controller 38 is limited to the maximum allowable fan speed determined in step 45. As a result, the speed of both fans 10 and 12 is adjusted to the average speed by increasing or decreasing the speed of each fan, thereby resulting in optimal power consumption and noise emissions for both fans 10 and 12 while meeting the cooling requirements of all four heat transfer cores 14, 16, 18, and 20.

In another embodiment of the present invention, at step 72, ECM 22 also preferably responds to both a braking signal 68 and a power request signal 70 received the operator of the work machine during the operation thereof. These signals are inputted to ECM 22 via means well known in the art. If signal 68 is indicative of a braking request, ECM 22 automatically determines the fan speed for both fans 10 and 12 to be a predetermined maximum threshold speed regardless of the cooling requirements of the heat transfer cores 14, 16, 18 and 20 thereby temporarily adding a parasitic load to the engine of the work machine so as to facilitate the overall deceleration of the work machine. In this embodiment, the parasitic load will remain for as long as the braking request remains in effect.

Alternatively, if signal 70 is indicative of a power boost request, ECM 22 automatically determines the fan speed for both fans 10 and 12 to be a predetermined minimum threshold speed, thereby temporarily decreasing the load upon the engine of the work machine and allowing more power therefrom to be delivered to the powertrain of the work machine. In this embodiment, the speed of fans 10 and 12 will remain at a minimum running speed until elevated set point temperatures for the cooled fluids in cores 14, 16, 18 and 20 are reached. When one or more of the elevated set point temperatures for the cooled fluids are, in fact, reached, the fan speeds will again be controlled in accordance with the logic set forth in FIGS. 4A and 4B and described above. Those skilled in the art will appreciate that ECM 22 will at the most receive only one of the two signals 68 and 70 at any one time, indicating either a braking request or a power boost request for the work machine. When both signals 68 and 70 are in an off state, ECM 22 will again determine the appropriate speed for fans 10 and 12 as explained above.

ECM 22 then delivers a signal 74 indicative of a desired fan speed for upper fan 10 to a motor controller 76, and a signal 78 indicative of a desired fan speed for lower fan 12 to a motor controller 80, whereby motor controllers 76 and 80 drive the speed of both fans 10 and 12 to the speed indicated by signals 74 and 78 respectively. ECM 22 thus controls the speed of both fans 10 and 12 individually to efficiently satisfy the cooling requirements of all four heat transfer cores 14, 16, 18, and 20.

INDUSTRIAL APPLICABILITY

As described herein, the present control system has particular utility in all types of work machines, vehicles, and engines wherein cooling a plurality of heat transfer cores is necessary. The present control system permits controlling the speed of a plurality of fans in a work machine in accordance with the cooling requirements of each of the plurality of heat transfer cores instead of in accordance with the instantaneous engine speed. The temperatures of fluids present in the heat transfer cores help determine the instantaneous cooling requirements of their respective heat transfer cores, whereby ECM 22 can determine an appropriate speed for each fan and output individual signals to the respective motor controller for each fan to control the speed of that particular fan. The present invention prevents overcooling of the fluids, and conserves power by limiting each fan's performance to simultaneously satisfy the cooling requirements of each heat transfer core. Furthermore, operation of the fans is kept disengaged during initial start up of the engine, thereby improving the cold-start reliability and the cranking power of the engine.

Those skilled in the art will appreciate that the ATAAC core and the engine coolant core shall be the first fluids to rise in temperature upon commencement of operation of the work machine. Therefore, by the time that the hydraulic oil or the transmission oil temperature rises above an overcooled threshold temperature, the ATAAC core and engine coolant temperature must have already exceeded at least a minimum overcooled temperature threshold therefor. Accordingly, the logic implemented in ECM 22 does not, and typically need not, take into account overcooled temperature thresholds for the ATAAC core 14 or the engine coolant core 16 when determining fan speed for either upper fan 10 or for lower fan 12.

It is recognized and anticipated that if the fan speed for either fan 10 or 12 is determined to be zero because the temperature for either the hydraulic oil or the transmission oil (respectively) is at or below a respective predetermined overcooled temperature threshold, then additional steps may be implemented in the ECM 22 to increase the speed of the other fan to satisfy the cooling requirements of all three remaining cores. Furthermore, steps may be implemented in ECM 22 to control the speed of the fan associated with the overcooled oil core to run at a minimum speed necessary to satisfy the cooling requirements of the ATAAC core and the engine coolant core if the other fan cannot do so while running at a maximum threshold speed. Such steps may be implemented in addition to those described above in a similar manner as those described above and such implementation is well known to those skilled in the art. Accordingly, such additional steps are recognized and anticipated, and are intended to be covered by the present invention without departing from the spirit and scope of the present invention.

It is preferred that the steps depicted in the logic diagram of FIGS. 4A and 4B be repeated at a predetermined interval for at least as long as the work machine is operating or until the engine is turned off. This predetermined interval can be based upon a specific predetermined period of time, or such interval can be based upon predetermined incremental changes in temperature of one or more of the various fluids, or upon some other parameter or other criteria. In addition, at steps 76 and 80, ECM 22 can be programmed to either loop back and repeat the steps thereof, or ECM 22 could terminate and such steps could be thereafter repeated based upon the predetermined repeat criteria for again triggering the operating steps thereof.

It is recognized and anticipated that heat transfer cores for any number of fluids utilized in a work machine may be served substantially in accordance with the steps of the present invention, and that the present logic may be appropriately extended to control any number of plurality of fans to efficiently satisfy the cooling requirements of the particular heat transfer cores served thereby. Similarly, the fan speed relationships illustrated in the graphs of FIGS. 5, 6, 7, 8 and 9 may be scaled according to the size, capacity, power requirements of the particular fans, or temperature requirements of the components being cooled utilized in any particular embodiment. Accordingly, all such variations or modifications are recognized and anticipated and are intended to be covered by the present invention without departing from the spirit or scope thereof.

It is also recognized that variations to the operating steps depicted in the logic diagram of FIGS. 4A and 4B could be made without departing from the spirit and scope of the present invention. In particular, steps could be added or some steps could be eliminated. All such variations are intended to be covered by the present invention.

As is evident from the foregoing description, certain aspects of the present invention are not limited to the particular details of the examples illustrated herein, and it is therefore contemplated that other modifications and applications will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A control system for controlling the speed of a plurality of fans for cooling a plurality of fluids in a work machine, each of said plurality of fluids being operative between a predetermined minimum threshold temperature and a predetermined maximum threshold temperature, said control system comprising:
   a plurality of sensors positioned to sense the temperature of each of the plurality of fluids, each sensor being operable to output a signal indicative of the temperature of that particular fluid;
   an electronic controller coupled with said plurality of sensors for receiving signals therefrom, said controller being operable to receive a signal from each of said plurality of sensors indicative of a temperature for each of the plurality of fluids;
   said controller being further operable to determine a desired fan speed for each of said plurality of fans based upon signals received from said plurality of sensors; and
   said controller outputting a signal to each of said plurality of fans to individually control the speed thereof, each output signal being indicative of a desired fan speed for a particular fan and each output signal being based upon a comparison of at least some of the signals received from said plurality of sensors.

2. The control system as set forth in claim 1, wherein each output signal is based upon one of the compared fluids being closer to its predetermined maximum threshold temperature than the remaining compared fluids.

3. The control system as set forth in claim 1, wherein said controller determines a fan speed for one of said plurality of fans to be zero if one of the plurality of compared fluids is at a temperature which is below the predetermined minimum threshold temperature for that particular fluid.

4. The control system as set forth in claim 1, wherein said plurality of fans includes at least two fans and wherein said plurality of fluids includes at least four fluids.

5. The control system as set forth in claim 4, wherein a first fan serves at least a portion of a first heat transfer core associated with a first fluid, at least a portion of a second heat transfer core associated with a second fluid, and a third heat transfer core associated with a third fluid, and wherein a second fan serves at least a portion of said first heat transfer core associated with said first fluid, at least a portion of said second heat transfer core associated with said second fluid, and a fourth heat transfer core associated with a fourth fluid.

6. The control system as set forth in claim 5, wherein said controller determines the speed of said first fan based upon a comparison of the signals received from said plurality of sensors associated with said first, second and third fluids, and wherein said controller determines the speed of said second fan based upon a comparison of the signals received from said plurality of sensors associated with said first, second and fourth fluids.

7. The control system as set forth in claim 6, wherein the speed of the first fan is determined based upon one of said first, second and third fluids being closer to its predetermined maximum threshold temperature than the remaining two fluids.

8. The control system as set forth in claim 6, wherein the speed of the second fan is determined based upon one of said first, second and fourth fluids being closer to its predetermined maximum threshold temperature than the remaining two fluids.

9. The control system as set forth in claim 5, wherein said first heat transfer core is an ATAAC core and wherein said first fluid is the inlet manifold air to said ATAAC core.

10. The control system as set forth in claim 5, wherein said second heat transfer core is an engine coolant core and wherein said second fluid is the engine coolant.

11. The control system as set forth in claim 5, wherein said third heat transfer core is a hydraulic oil core and wherein said third fluid is the hydraulic oil.

12. The control system as set forth in claim 5, wherein said fourth heat transfer core is a transmission oil core and wherein said fourth fluid is the transmission oil.

13. The control system as set forth in claim 5, wherein:
said control system is further operable to determine a temperature error for each signal received from the sensors sensing the temperature of each of said first, second, third and fourth fluids, each of said temperature errors being computed based upon a difference between a predetermined desired threshold temperature for that particular fluid and the temperature of that particular fluid as indicated by the signal received from that fluid's sensor;
said controller being operable to determine a fan speed for said first fan based upon the largest temperature error existing between the sensor signals received from said first, second, and third fluids; and
said controller being operable to determine a fan speed for said second fan based upon the largest temperature error existing between the sensor signals received from said first, second and fourth fluids.

14. The control system as set forth in claim 13, wherein said controller is operable to determine a fan speed for said first fan to be substantially the same as the fan speed for said second fan if the larger of the temperature errors for the first and second fluids exceeds the temperature errors for both the third and fourth fluids.

15. The control system as set forth in claim 1, wherein said controller is coupled to the work machine for receiving a power request signal therefrom, said control system determining the fan speed for each of said plurality of fans to be a minimum predetermined speed when said power request signal is received.

16. The control system as set forth in claim 15, wherein the fan speed for each of said plurality of fans is maintained at a minimum predetermined speed until a predetermined maximum threshold temperature for one of said fluids is reached.

17. The control system as set forth in claim 1, wherein said controller is coupled to the work machine for receiving a braking signal therefrom, said controller determining the fan speed for each of said plurality of fans to be a maximum predetermined speed for as long as said braking signal is received.

18. A control system for controlling the speed of two fans for cooling four fluids in a work machine, each fluid being associated with a particular heat transfer core and each fluid being operable between a predetermined minimum threshold temperature and a predetermined maximum threshold temperature, the control system comprising:
a first sensor positioned to sense the temperature of the first fluid and to output a signal indicative thereof;
a second sensor positioned to sense a temperature of the second fluid and to output a signal indicative thereof;
a third sensor positioned to sense a temperature of the third fluid and to output a signal indicative thereof;
a fourth sensor positioned to sense a temperature of the fourth fluid and to output a signal indicative thereof;
an electronic controller coupled with said first, second, third and fourth sensors for receiving signals therefrom, said controller being operable to receive a signal from each of said sensors indicative of the temperature of said first, second, third and fourth fluids respectively;
said controller being further operable to determine a first temperature error for the signal received from said first sensor, a second temperature error for the signal received from said second sensor, a third temperature error for the signal received from said third sensor, and a fourth temperature error for the signal received from said fourth sensor, each of said temperature errors being computed based upon a difference between a predetermined desired threshold temperature for that particular fluid and the temperature of that particular fluid as indicated by the signal received from that fluid's sensor;
said controller being further operable to determined a fan speed for said first and second fans based upon a comparison of at least some of the temperature errors determined from said first, second, third and fourth sensors; and
said controller being further coupled to the drive motor of said first fan and to the drive motor of said second fan and outputting a signal respectively thereto to control the speed of said first and second fans, each output signal being indicative of a desired fan speed for that particular fan.

19. The control system as set forth in claim 18, wherein said first fan serves a least a portion of a first heat transfer core associated with said first fluid, at least a portion of a second heat transfer core associated with said second fluid, and a third heat transfer core associated with said third fluid, and wherein said second fan serves at least a portion of said first heat transfer core associated with said first fluid, at least a portion of said second heat transfer core associated with said second fluid, and a fourth heat transfer core associated with said fourth fluid.

20. The control system as set forth in claim 19, wherein said controller is operable to determine a fan speed for said first fan based upon the largest temperature error existing between the signals received from said first, second and third sensors; and
said controller being operable to determine a fan speed for said second fan based upon the largest temperature error existing between the signals received from said first, second and fourth sensors.

21. The control system as set forth in claim 20, wherein said controller is operable to determine a fan speed for said first fan to be substantially the same as the fan speed for said second fan if the larger of said first and second temperature errors exceeds both the third and fourth temperature errors.

22. The control system as set forth in claim 19, wherein said controller determines a fan speed for said first fan to be zero if the temperature of said third fluid is at a predetermined overcooled threshold temperature for that particular fluid.

23. The control system as set forth in claim 19, wherein said controller determines a fan speed for said second fan to be zero if the temperature of said fourth fluid is at a predetermined overcooled threshold temperature for that particular fluid.

24. The control system as set forth in claim 18, wherein said controller is coupled to the work machine for receiving a power request signal therefrom, said control system determining the fan speed for said first and second fans to be a minimum predetermined speed for each of said fans when said power request signal is received.

25. The control system as set forth in claim 24, wherein the fan speed for said first and second fans is maintained at a minimum predetermined speed until a predetermined maximum threshold temperature for one of said fluids is reached.

26. The control system as set forth in claim 18, wherein said controller is coupled to the work machine for receiving a braking signal therefrom, said controller determining the fan speed for said first and second fans to be a maximum predetermined speed for each such fan for as long as said braking signal is received.

27. The control system as set forth in claim 18, wherein said controller is further operable to scale each of said first, second, third and fourth temperature errors by a corresponding first, second, third and fourth predetermined value.

28. The control system as set forth in claim 19, wherein said first heat transfer core is an ATAAC core and wherein said first fluid is the inlet manifold air to said ATAAC core.

29. The control system as set forth in claim 28, wherein the predetermined desired threshold temperature for said first fluid is a function of the ambient air temperature, said control system further including a fifth sensor positioned to sense the ambient air temperature and to output a signal indicative thereof, said controller being coupled to said fifth sensor for receiving signals therefrom indicative of the ambient air temperature and said controller being further operable to at least periodically update the predetermined desired threshold temperature for said first fluid based upon the signals received from said fifth sensor.

30. The control system as set forth in claim 19, wherein said second heat transfer core is an engine coolant core and wherein said second fluid is the engine coolant.

31. The control system as set forth in claim 19, wherein said third heat transfer core is a hydraulic oil core and wherein said third fluid is the hydraulic oil.

32. The control system as set forth in claim 19, wherein said fourth heat transfer core is a transmission oil core and wherein said fourth fluid is the transmission oil.

33. A method for controlling the speed of a plurality of fans for cooling a plurality of fluids in a work machine, each of said plurality of fluids being operative between a predetermined minimum threshold temperature and a predetermined maximum threshold temperature, said method comprising the steps of:

positioning a plurality of sensors to sense the temperature of each of the plurality of fluids, each sensor being operable to output a signal indicative of the temperature of that particular fluid;

coupling an electronic controller with said plurality of sensors for receiving signals therefrom, said controller being operable to receive a signal from each of said plurality of sensors indicative of a temperature for each of the plurality of fluids;

operably determining a desired fan speed for each of said plurality of fans based upon signals received from said plurality of sensors utilizing said controller; and outputting a signal to each of said plurality of fans to individually control the speed thereof utilizing said controller, each output signal being indicative of a desired fan speed for a particular fan and each output signal being based upon a comparison of at least some of the signals received from said plurality of sensors.

34. The method as set forth in claim 33, wherein said step of outputting a signal further includes the step of having each output signal based upon one of the compared fluids being closer to its predetermined maximum threshold temperature than the remaining compared fluids.

35. The method as set forth in claim 33, wherein said step of operably determining a desired fan speed for each of said plurality of fans will be zero for one of said plurality of fans if one of the plurality of compared fluids is at a temperature which is below the predetermined minimum threshold temperature for that particular fluid.

* * * * *